United States Patent [19]

Taniguchi

[11] Patent Number: 5,339,310

[45] Date of Patent: Aug. 16, 1994

[54] SWITCHING APPARATUS FOR SWITCHED NETWORK OF ASYNCHRONOUS TRANSFER MODE

[75] Inventor: Ikuo Taniguchi, Kawasaki, Japan

[73] Assignees: Fujitsu Limited, Kawasaki; Nippon Telegraph and Telephone Corp., Tokyo, both of Japan

[21] Appl. No.: 849,339

[22] Filed: Mar. 11, 1992

[30] Foreign Application Priority Data

Mar. 14, 1991 [JP] Japan .................. 3-049474

[51] Int. Cl.[5] .................................. H04L 12/56
[52] U.S. Cl. ......................... 370/60; 370/94.1
[58] Field of Search ............ 370/60, 94.1, 14, 13, 370/17

[56] References Cited

U.S. PATENT DOCUMENTS

| | | | |
|---|---|---|---|
| 4,956,839 | 9/1990 | Torii et al. | 370/94.1 |
| 5,127,000 | 6/1992 | Henrion | 370/94.1 |
| 5,189,666 | 2/1993 | Kagawa | 370/94.1 |

*Primary Examiner*—Douglas W. Olms
*Assistant Examiner*—Dang Ton
*Attorney, Agent, or Firm*—Staas & Halsey

[57] ABSTRACT

A switching apparatus for a switched network of the asynchronous transfer mode includes a path inspection control device connected to an input interface board, a switching network, and an output interface board. Cells for path inspection are supplied parallel to the input interface board; routing information is supplied to the switching network; the transmissions of the cells for path inspection are simultaneously switched accordingly; the cells for path inspection are delivered in parallel formation from the output interface board; the cells for path inspection delivered from the output interface board are compared with predetermined comparison data, and the routing information and the cells for path inspection or the comparison data are changed in synchronization with predetermined time signals.

3 Claims, 14 Drawing Sheets

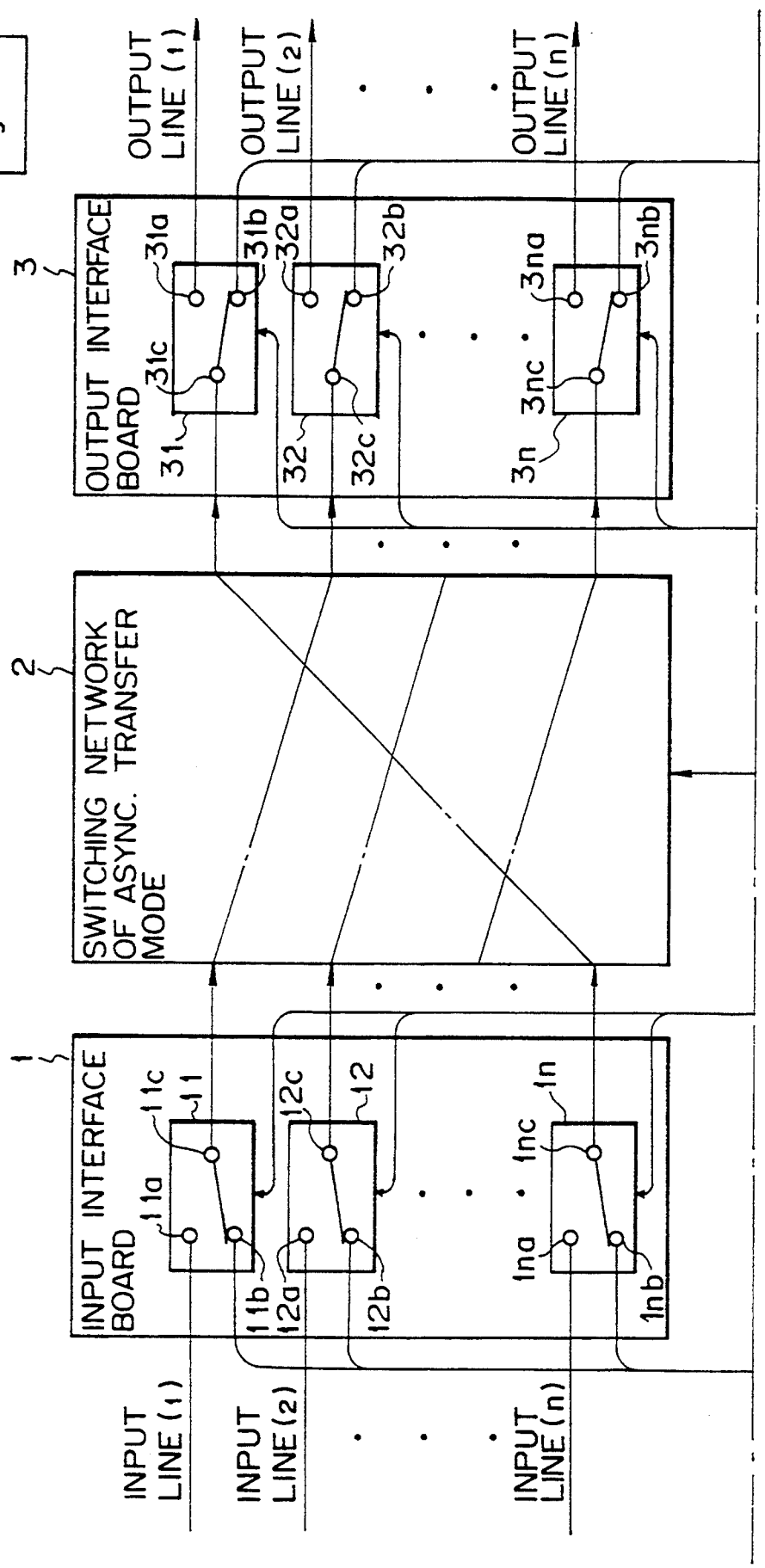

Fig. 4A
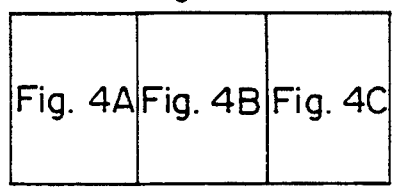
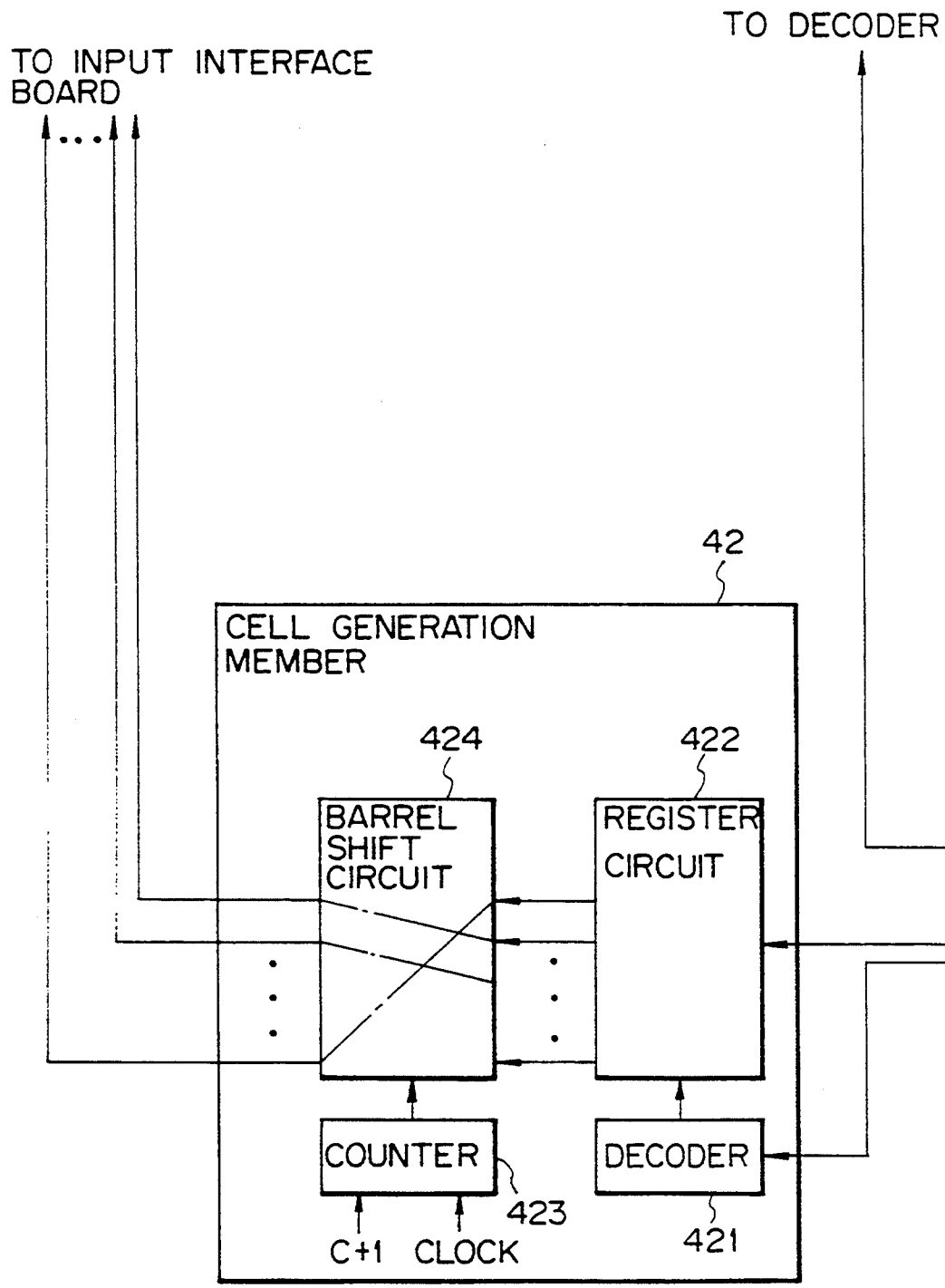

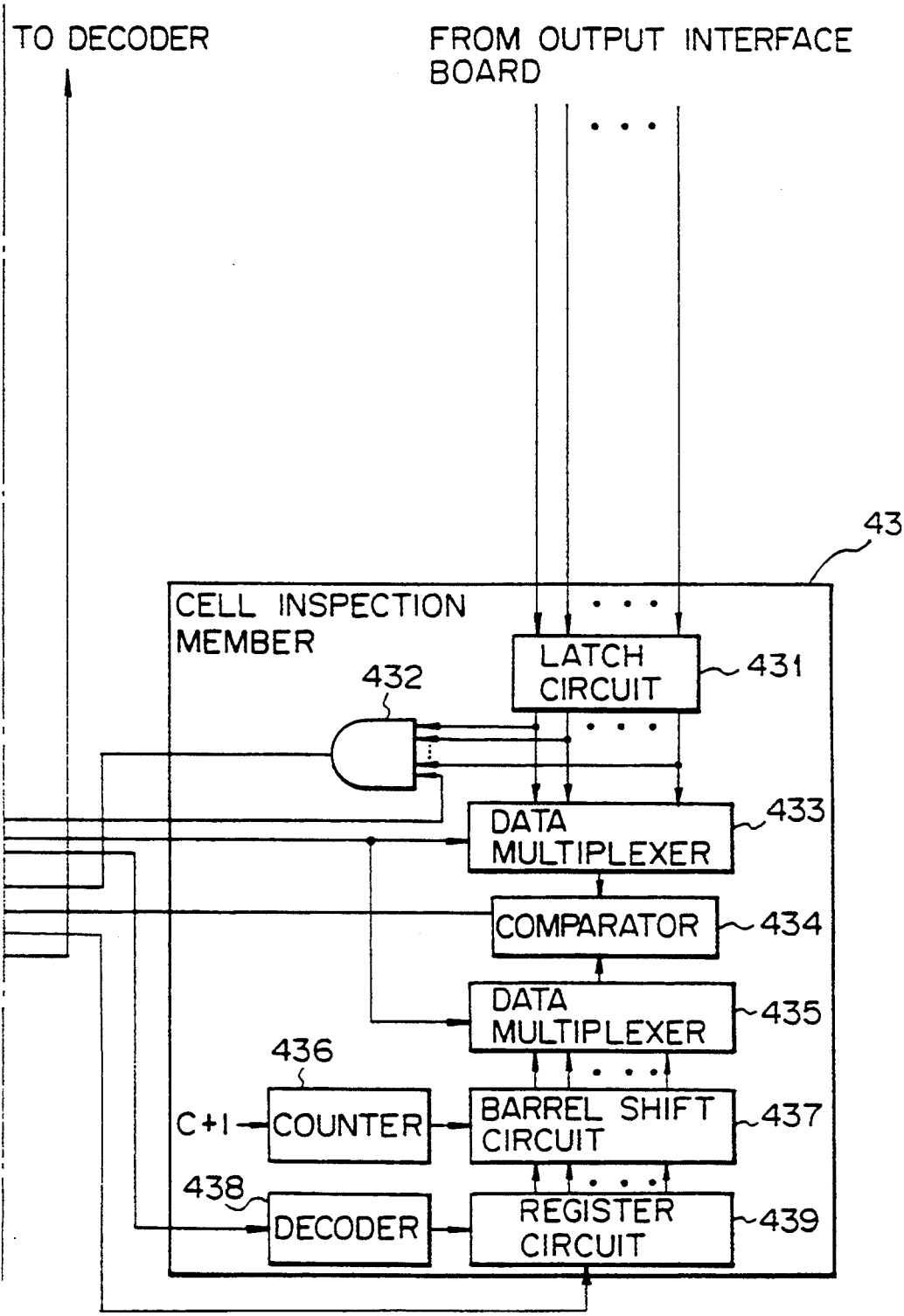

Fig. 7

| | CELL GENERATION MEMBER | ROUTING INFORMATION GENERATION MEMBER | CELL INSPECTION MEMBER |
|---|---|---|---|
| CYCLE PERIOD T1 | HP (1,1)<br>HP (2,2) ... HP (n,n) | IP(1) → OP(1)<br>IP(2) → OP(2) ... IP(n) → OP(n) | HP (1,1)<br>HP (2,2) ... HP (n,n) |
| CYCLE PERIOD T2 | HP (2,2)<br>HP (3,3) ... HP (1,1) | IP(1) → OP(1)<br>IP(2) → OP(2) ... IP(n) → OP(n) | HP (1,1)<br>HP (2,2) ... HP (n,n) |
| ... | ... | ... | ... |
| CYCLE PERIOD Tn | HP (n,n)<br>HP (1,1) ... HP (n-1,n-1) | IP(1) → OP(1)<br>IP(2) → OP(2) ... IP(n) → OP(n) | HP (1,1)<br>HP (2,2) ... HP (n,n) |

Fig. 8

| | CELL GENERATION MEMBER | ROUTING INFORMATION GENERATION MEMBER | | CELL INSPECTION MEMBER |
|---|---|---|---|---|
| CYCLE PERIOD T₁ | HP (1,1)<br>HP (2,2)<br>.<br>.<br>.<br>HP (n,n) | IP(1) → OP(1)<br>IP(2) → OP(2)<br>.<br>.<br>.<br>IP(n) → OP(n) | | HP (1,1)<br>HP (2,2)<br>.<br>.<br>.<br>HP (n,n) |
| CYCLE PERIOD T₂ | HP (1,1)<br>HP (2,2)<br>.<br>.<br>.<br>HP (n,n) | IP(1) ↘ OP(1)<br>IP(2)  OP(2)<br>.<br>.<br>.<br>IP(n) ↗ OP(n) | | HP (n,n)<br>HP (1,1)<br>.<br>.<br>.<br>HP(n-1,n-1) |
| ... | | | | |
| CYCLE PERIOD Tn | HP (1,1)<br>HP (2,2)<br>.<br>.<br>.<br>HP (n,n) | IP(1) ↗ OP(1)<br>IP(2)  OP(2)<br>.<br>.<br>.<br>IP(n) ↖ OP(n) | | HP (2,2)<br>HP (3,3)<br>.<br>.<br>.<br>HP (1,1) |

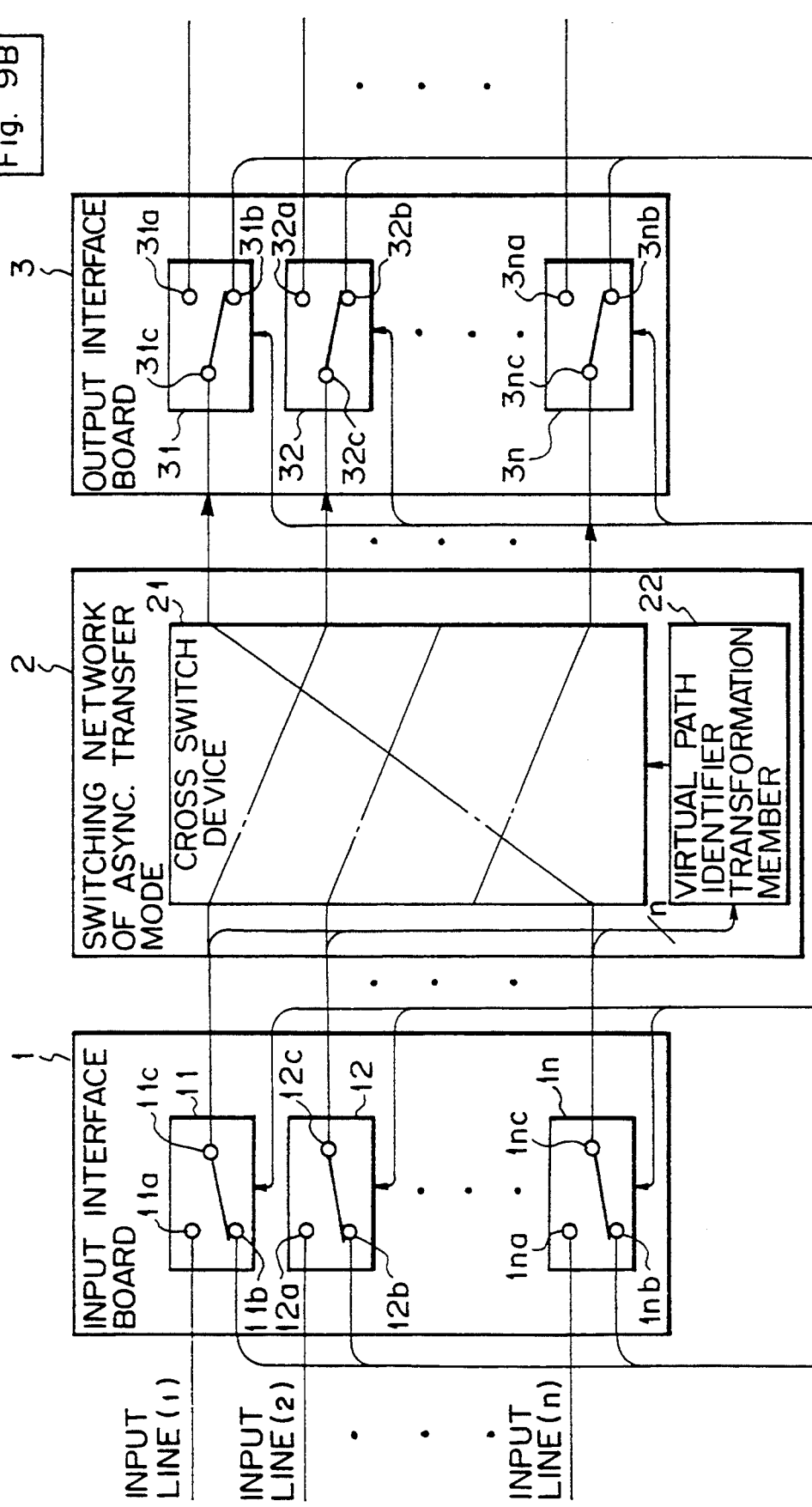

SWITCHING APPARATUS FOR SWITCHED NETWORK OF ASYNCHRONOUS TRANSFER MODE

BACKGROUND OF THE INVENTION

1. Field of the Invention

The present invention relates to a switching apparatus for a switched network of the asynchronous transfer mode (ATM). The switching apparatus according to the present invention is used for high speed transmission of data, such as voice, text, picture and the like, in a digital communication system, such as the integrated services digital network (ISDN).

2. Description of the Related Arts

In general, during the operation of a switching apparatus of a switching network of the asynchronous transfer mode, first, a signal is preliminarily sent to a decoder for the input interface board in the path inspection control device and the control of a central processing unit, and a first input line is connected to the test side. In the first test cycle period, comparison data is set in the comparison data register in the path inspection control device; output line data is set in the output line data register; a signal is sent to the decoder for the output interface board; the line of the output line data is connected to the test side, and cell data is set in the register for the header and information. The cell data is made to be a cell for path inspection, and the produced cell for path inspection is delivered. If the operation of the switching apparatus of a switched network of the asynchronous transfer mode is normal, the cell for path inspection passes through the first path and is latched in a latch member. The data of the latch member and the data of the comparison data register are compared in a comparator, and, if the data coincide, a signal indicating normality is sent to the central processing unit.

In the second test cycle period, comparison data is set in the comparison data register, the second output line data is set in the output line data register; a signal is sent to the decoder for the input interface board; the second output line of the interface board is connected to the test side, and a cell data is set in the register for header and information. The cell data is delivered as a cell for path inspection by the cell generation member, and, if the operation of the switching apparatus for a switched network of the asynchronous transfer mode is normal, the cell for path inspection passes through the second path, and is latched in the latch member. The content of the latch member and the content of the comparison data register are compared by the comparator, and, if the content of the latch member and the content of the comparison data register coincide, the normality signal is sent to the central processing unit.

In a similar manner, the processes are carried out up to the n-th test cycle period.

After that, a signal is sent to the decoder for the input interface board by the central processing unit; the second input line of the interface board is connected to the test side, and the processes of the first test cycle period to the n-th test cycle period are similarly carried out. After that, the similar processes of test are carried out until the n-th input line of the interface board is connected to the test side, and accordingly, the process of inspection is completed.

Thus, in the prior art switch apparatus for a switched network of the asynchronous transfer mode, the time required for the inspection of the entire paths is extended to $n^2 \times t$, where the time of the process of one test cycle period is t.

SUMMARY OF THE INVENTION

An object of the present invention is to provide an improved switching apparatus for a switched network of the asynchronous transfer mode in which the "n" path information is designated simultaneously from the outside; the function of the paths of the switching network of the asynchronous transfer mode is inspected in a parallel manner, and the "n" paths are capable of changing automatically in accordance with predetermined time signals, so that the inspection of the entire paths can be carried out at a considerably high speed.

In accordance with the present invention, there is provided a switching apparatus for a switched network of the asynchronous transfer mode including an input interface board adapted to receive cells for path inspection; a switching network connected to the input interface board for switching the transmissions of the cells for path inspection in accordance with external routing information; an output interface board connected to the switching network for delivering the cells for path inspection received from the switching network; and a path inspection control device connected to the input interface board, the switching network, and the output interface board for controlling the path inspection through the input interface board, the switching network, and the output interface board. The operation of the path inspection control device is adapted such that, cells for path inspection are supplied parallel to the input interface board; routing information is supplied to the switching network; the transmissions of the cells for path inspection are simultaneously switched accordingly; the cells for path inspection are delivered in parallel formation from the output interface board; the cells for path inspection delivered from the output interface board are compared with predetermined comparison data, and the routing information and the cells for path inspection or the comparison data are changed in synchronization with predetermined time signals.

In accordance with the present invention, there is also provided a switching apparatus for a switched network of the asynchronous transfer mode including an input interface board adapted to receive a cell for path inspection; a switching network connected to the input interface board for switching the transmissions of the cells for path inspection simultaneously in accordance with destination information of the cells for path inspection; an output interface board connected to the switching network for delivering the cells for path inspection received from the switching network, and a path inspection control device connected to the input interface board and the output interface board for controlling the path inspection through the input interface board and the output interface board. The operation of the path inspection control device is adapted such that cells for path inspection are supplied parallel to the input interface board; the cells for path inspection are delivered in parallel formation from the output interface board; the cells for path inspection thus supplied and thus delivered are compared and inspected with respect to predetermined comparison data, and the cells for path inspection are changed in synchronization with predetermined time signals.

BRIEF DESCRIPTION OF THE DRAWINGS

FIGS. 3 and 3A-3B are a schematic diagram of a switching apparatus for a switched network of the asynchronous transfer mode according to an embodiment of the present invention;

FIGS. 4 and 4A-4C show an example of the structures of the routing information generation member, the cell generation member, the cell inspection member, and the central processing unit used for the path inspection control device in the apparatus of FIG. 3;

FIGS. 5 and 5A-5B are a flow chart of the operation of the path inspection control in the apparatus of FIG. 3;

FIG. 7 illustrates an example of the sequence of the generation of the data in the path inspection control device;

FIG. 8 illustrates another example of the sequence of the generation of the data in the path inspection control device; and FIGS. 9 and 9A-9B are a schematic diagram of a switching apparatus for a switched network of the asynchronous transfer mode according to another embodiment of the present invention.

DESCRIPTION OF THE PREFERRED EMBODIMENTS

Figure 1:
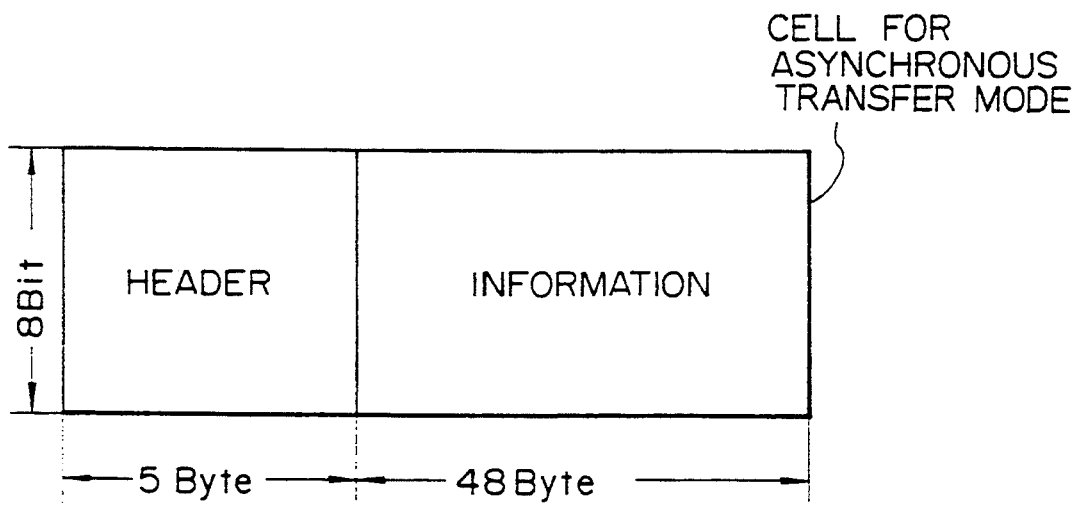
FIG. 1 shows an example of the pattern of a cell used for the general switched network of the asynchronous transfer mode.
Figure 2:
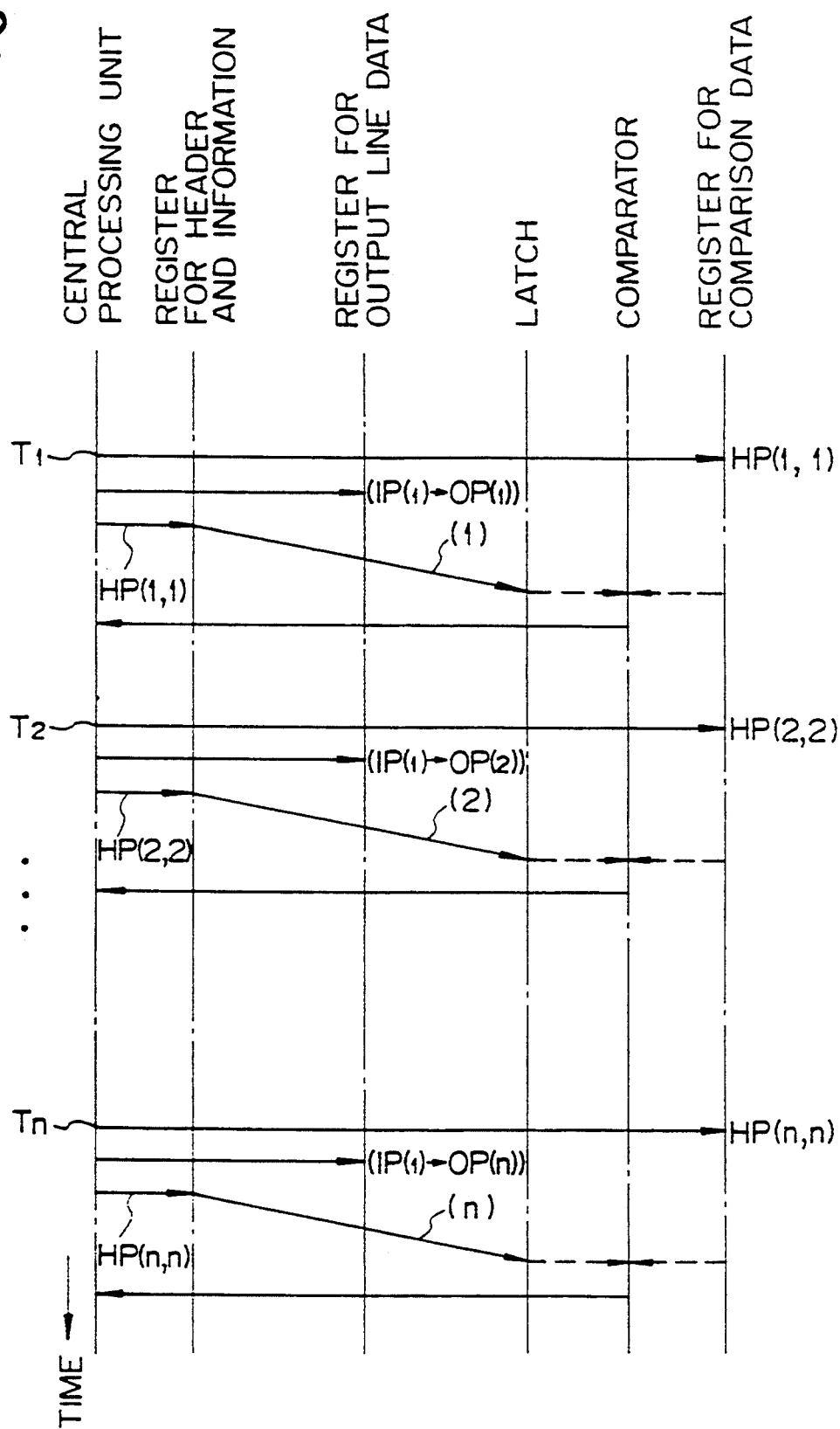
FIG. 2 illustrates the operation of the path inspection control of the asynchronous transfer mode in a prior art switching apparatus for a switched network of the asynchronous transfer mode.

Before describing preferred embodiment, a prior art switching apparatus of a switched network of the asynchronous transfer mode for digital communication is explained with reference to FIGS. 1 and 2. In general, in the switched network of the asynchronous transfer mode, a block of information is called a "cell" and has a predetermined fixed length consisting of the header and the data field ("information"). The signal transmission in the network is carried out in a multiplexed manner, using the cell as a unit, in accordance with the logical channel number indicated in the header of the cell.

A prior art switching apparatus of a switched network of the asynchronous transfer mode for digital communication comprises an input interface board through which a cell for path inspection (OAM) is capable of being inserted; a switching network of the asynchronous transfer mode, connected to the input interface board for switching the transmission of the cell in accordance with a virtual path identifier (VPI); an output interface board, connected to the switching network, for delivering the cell received from the switching network; and a path inspection control device connected to the input interface board, the switching network and the output interface board, for controlling the inspection of the path of the cell. The path inspection control device includes a virtual path identifier transformation member, a central processing unit, a latch member, a comparator, a cell generation member, a decoder for the input interface board, a decoder for the output interface board, a register for registering the header and the information of the path inspection cell, a register for registering the output line data concerning the path inspection cell, and a register for registering comparison data corresponding to the generated path inspection cell.

The operation of the prior art switching apparatus of a switched network of the asynchronous transfer mode for a digital communication is as follows. First, a signal is preliminarily sent to the decoder for the input interface board under the control of a central processing unit, and a first input line is connected to the test side. In the subsequent first test cycle period $T_1$, a comparison data HP(1, 1) is set in the comparison data register; output line data OP(1) is set in the output line data register; a signal is sent to the decoder for the output interface board; the line of the output line data OP(1) is connected to the test side, and a cell data HP(1, 1) is set in the register for the header and information. The symbol HP(1, 1) represents that the destination indicated in the header is "1", i.e., OP(1), and the data is "1".

The cell data HP(1, 1) is made to be a cell for path inspection (OAM) in a cell generation portion, and the produced cell for path inspection is delivered. If the operation of the switching apparatus of a switched network of the asynchronous transfer mode is nodal, the cell for path inspection passes through path (1) and is latched in the latch member. The data of the latch member and the data of the comparison data register are compared in the comparator, and, if the two data coincide, a signal indicating normality is sent to the central processing unit.

In the next test cycle period $T_2$, comparison data HP(2, 2) is set in the comparison data register; output line data OP(2) is set in the output line data register; a signal is sent to the decoder for the input interface board; output line OP(2) of the interface board is connected to the test side, and a cell data HP(2, 2) is set in the register for header and information. The symbol HP(2, 2) represents that the destination indicated in the header H is "2", i.e. OP(2), and the data is "2".

The cell data HP(2, 2) is delivered as a cell for path inspection (OAM) by the cell generation member, and, if the operation of the switching apparatus of a switched network of the asynchronous transfer mode is normal, the cell for path inspection passes through path (2), and is latched in the latch member, The content of the latch member and the content of the comparison data register are compared by the comparator and, if the content of the latch member and the content of the comparison data register coincide, the signal indicating normality is sent to the control processing unit.

In a similar manner, the processes are carried out up to test cycle period $T_n$. After that, a signal is sent to the decoder for the input interface board by the central processing unit; an input line IP(2) of the interface board is connected to the test side, and the processes of test cycle periods $T_1$ to $T_n$ are carried out similarly as described above. After that, the similar test processes are carried out until an input line IP(n) of the interface board is connected to the test side, and accordingly the process of inspection is completed. Thus, in the prior art, the time required for the inspection of the entire number (n) of paths is extended to $n^2 \times t$, where the time of the process of one test cycle period is t.

Figure 3B:
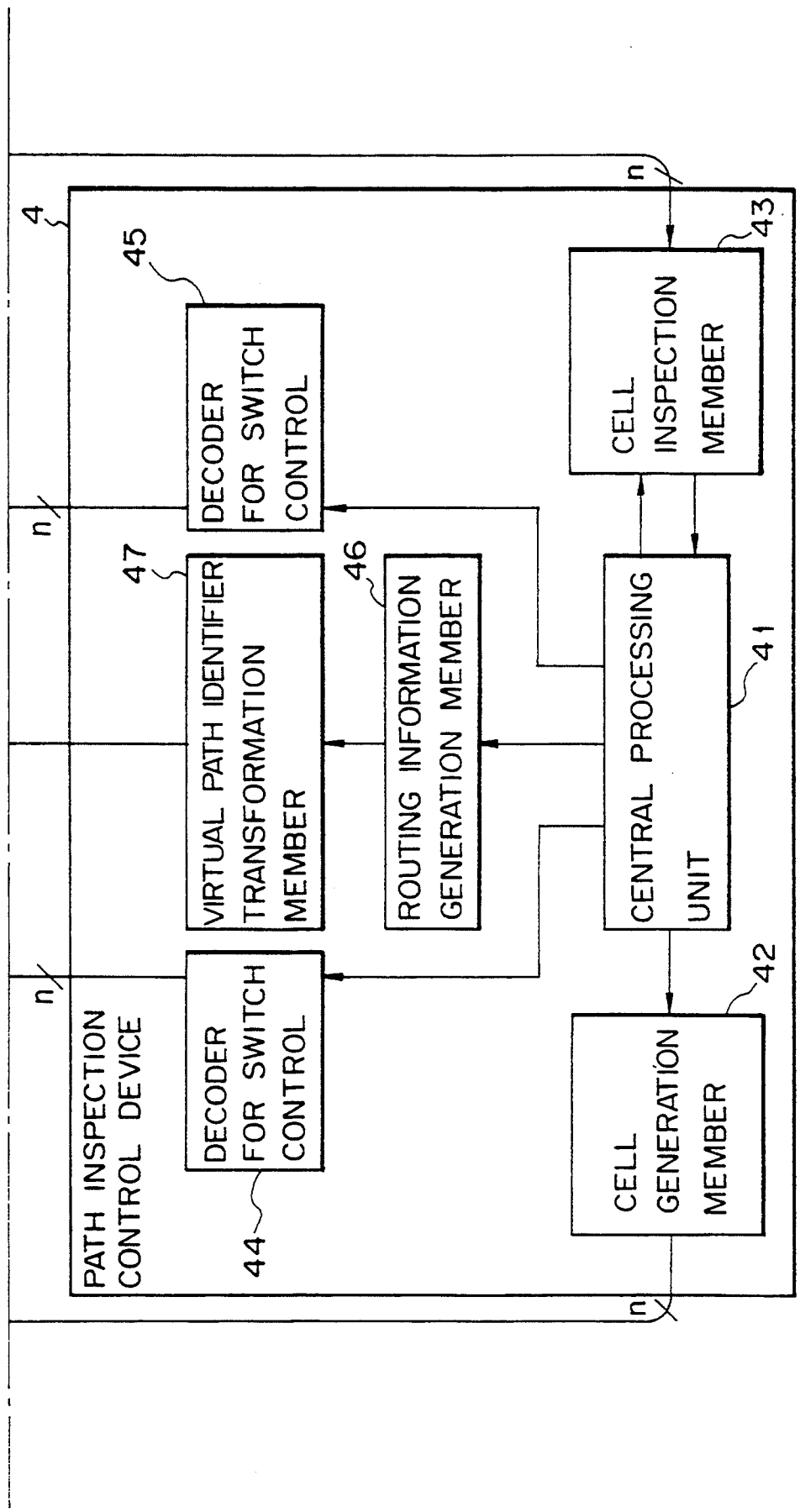

A switching apparatus for a switched network of the asynchronous transfer mode according to an embodiment of the present invention is shown in FIGS. 3A and 3B. The switching apparatus comprises an interface board 1 having a sequence of switches 11, 12, . . . 1n, a switching network 2 of the asynchronous transfer mode; an output interface board 3 having a sequence of switches 31, 32, . . . 3n, and a path inspection control device 4 having a central processing unit 41, a cell generation member 42, a cell inspection member 43, a decoder 44 for switch control, another decoder 45 for switch control, a routing information generation member 46, and a virtual path identifier transformation member 47.

In the input interface board 1, a cell for path inspection can be supplied through each of the input lines (1), (2) . . . (n). In the switching network 2 of the asynchronous transfer mode, the switching of the transmission of the cell is carried out. In the output interface board 3, a cell for path inspection can be delivered through each of the output lines (1), (2), . . . (n).

In the virtual path identifier transformation member 47, the output line data concerning the cell is transformed into the virtual path identifier (VPI) as the routing information. In the routing information generation member 46, routing information concerning the cells for path inspection generated in the cell generation member 42 is generated and the content of the routing informnation changes in synchronization with a predetermined time signal (C+1).

The decoder 45 for switch control causes a part or all of the output lines (1), (2), . . . (n) to be connected to the test side. The decoder 44 for switch control causes a part or all of the input lines (1), (2), . . . (n) to be connected to the test side.

In the cell inspection member 43, comparison data concerning the cells for path inspection generated in the cell generation portion 42, is generated and the content of the routing information changes in synchronization with a predetermined time signal (C+1).

Figure 4B:
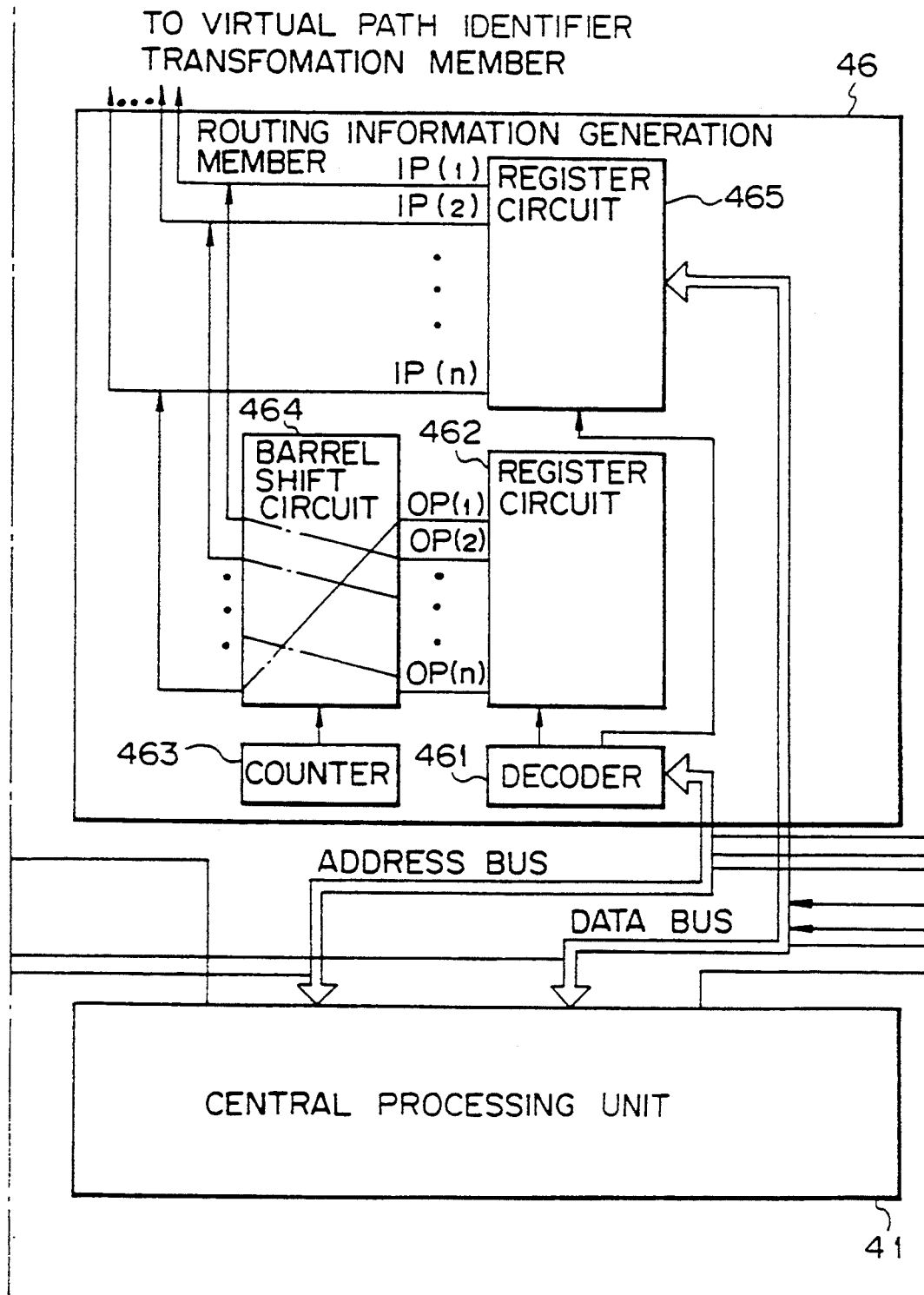

An example of the structures of the routing information generation member 46, the cell generation member 42, the cell inspection member 43, and the central processing unit 41 used for the path inspection control device 4 in the apparatus of FIGS. 3A and 3B is shown in FIGS. 4A to 4C.

The cell generation member 42 comprises a decoder 421, a register circuit 422, a counter 423, and a barrel shift circuit 424. In the register circuit 422, beginning data HP(1, 1), HP(2, 2), . . . HP(n, n) for generating in the register designated by the decoder 421, are successively registered. In the counter 423, predetermined time signals (C+1) are counted. In the barrel shift circuit 424, the beginning data HP(1, 1), HP(2, 2), . . . HP(n, n) from the register circuit 422 are barrel shifted in accordance with the output of the counter 423 and the barrel shifted data are delivered.

The routing information generation member 46 is constituted by a decoder 461, a register circuit 462, a counter 463, a barrel shift circuit 464, and a register circuit 465. In the register circuit 462, beginning data OP(1), OP(2), . . . OP(n) are successively registered into registers designated by the decoder 461. In the register circuit 465, beginning data IP(1), IP(2), . . . IP(n) are successively registered into registers designated by the decoder 461. In the counter 463, predetermined time signals (C+1) are counted. In the barrel shift circuit 464, the beginning data OP(1), OP(2), . . . OP(n) from the register circuit 462 are barrel shifted in accordance with the output of the counter 463 and the barrel shifted data are delivered.

The cell inspection member 43 is constituted by a latch circuit 431, an AND gate 432, a data multiplexer 433, a comparator 434, a data multiplexer 435, a counter 436, a barrel shift circuit 437, a decoder 438, and a register circuit 439. In the register circuit 439, beginning data HP(1, 1), HP(2, 2), . . . HP(n, n) for comparison are successively registered into registers designated by the decoder 438. In the counter 436, predetermined time signals (C+1) are counted. In the barrel shift circuit 437, beginning data HP(1, 1), HP(2, 2), . . . HP(n, n) for comparison are barrel shifted in accordance with the output of the counter 436, and the barrel shifted data are output. In the AND gate 432, the latching of all of the path inspections in the latch circuit 431, is detected.

Figure 5A:
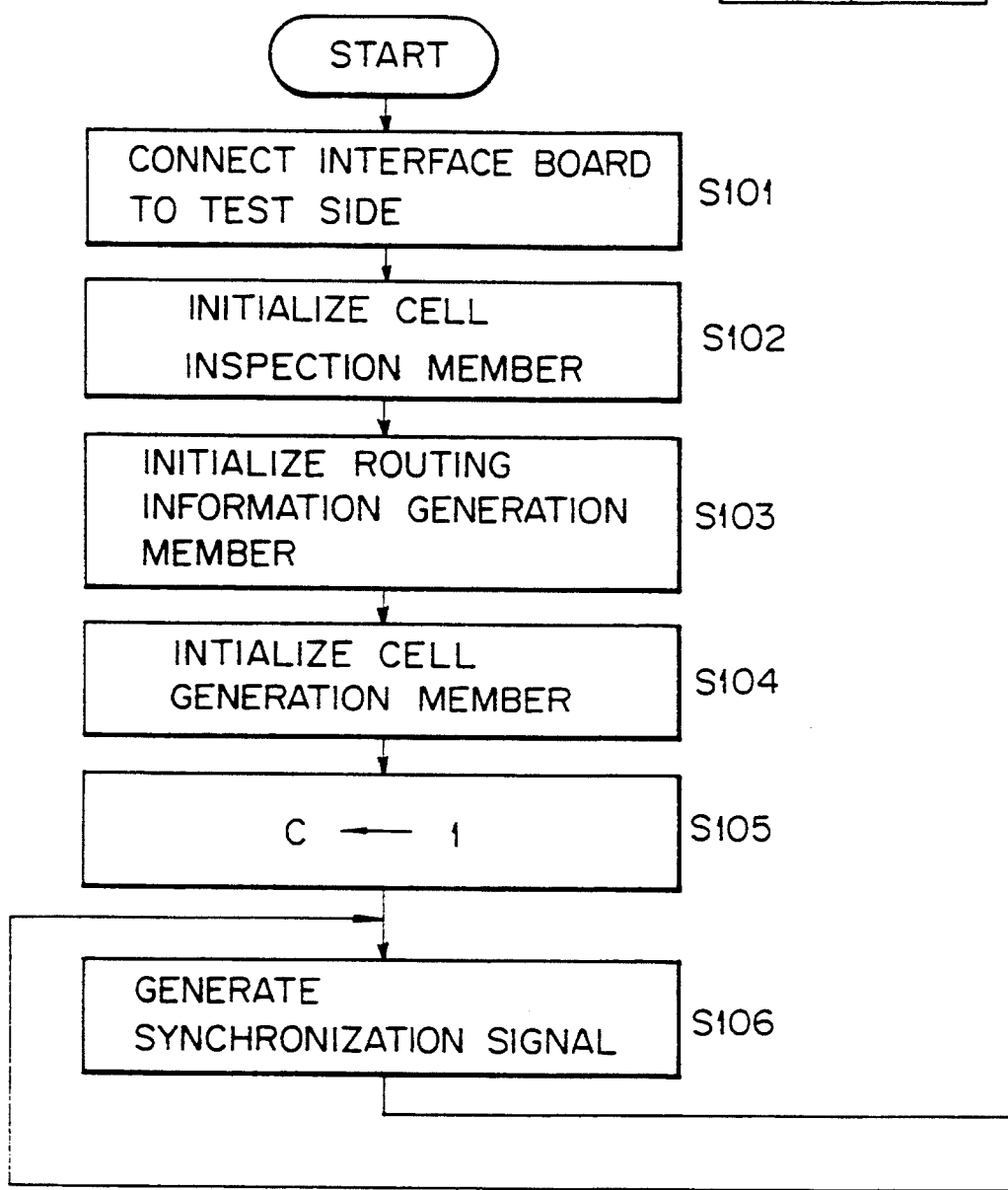
Figure 5B:
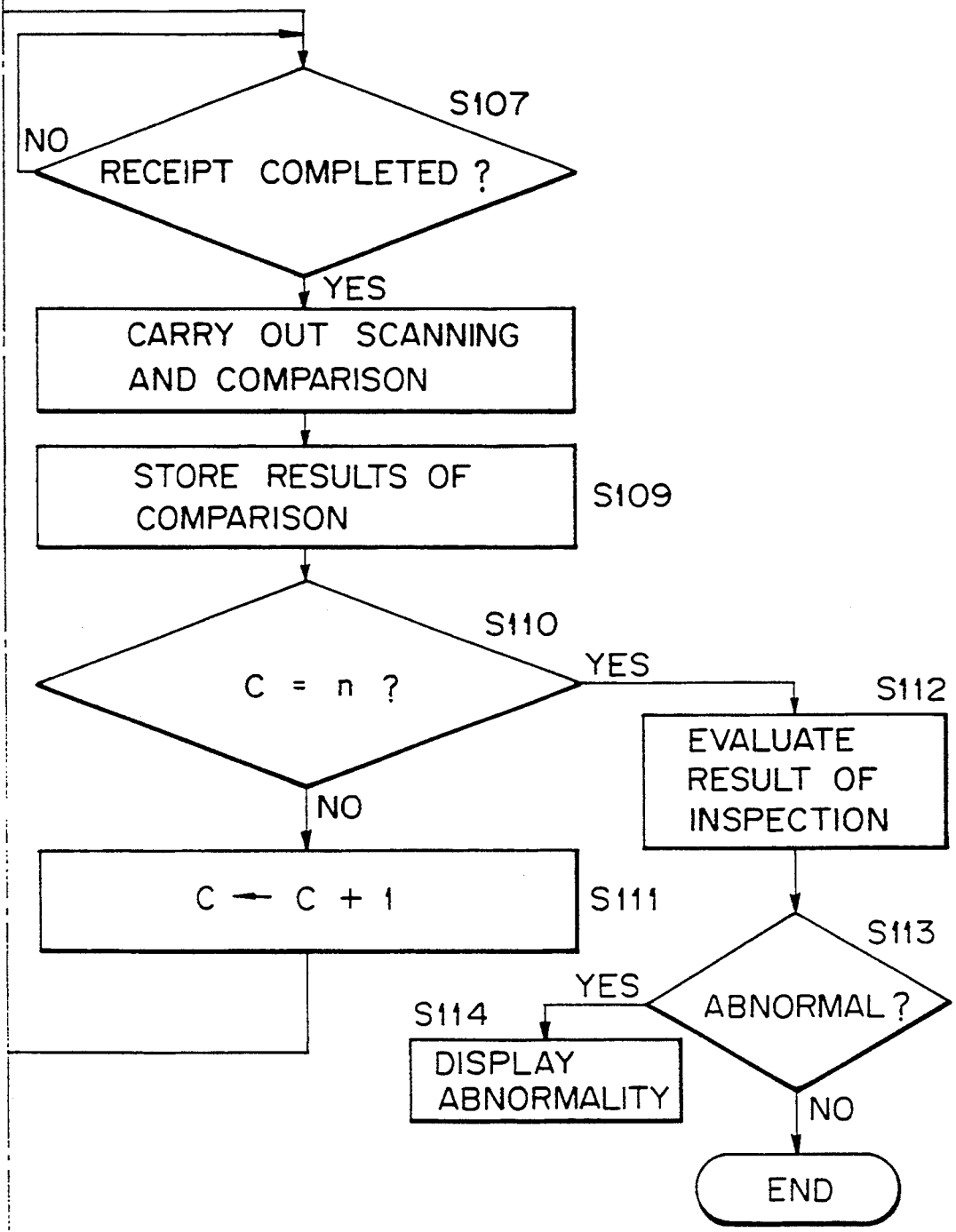

A flow chart of the operation of the path inspection control in the apparatus of FIGS. 3A and 3B are shown in FIGS. 5A and 5B. First, all input lines (1) through (n) of the input interface board 1 and all output lines (1) to (n) of the output interface board 3 are connected to the test side (S101). The beginning data HP(1, 1) through HP(n, n) for comparison are set in the cell inspection member 43 (S102). The beginning data IP(1) through IP(n) and OP(1) through OP(n) are set in the routing information generator member 46 (S103). The beginning data HP(1, 1) through HP(n, n) of the cell for path inspection are set in the cell generation member 42 (S104). Count 1 is set in a counter for counting the number of inspections (S105). Synchronization signals (T) are generated (S106). Thus, the cells for path inspection HP(1, 1) through HP(n, n) are generated in the cell generation member 42, are switched in the asynchronous transfer mode in accordance with the beginning data "IP(1) to OP(1)", "IP(2) to OP(2)", . . . "IP(n) to OP(n)", and are received by the cell inspection member 43.

The decision by the central processing unit 41 determining whether or not the receipt of all cells is completed, is carried out (S107). The scanning of the cells by the data multiplexer 433 and comparisons of the cells by the comparator 454 is carried out (S108). The results of the comparison are stored in a storage (S109), and the decision determining whether or not C=n is carried out (S110). If the decision is NO, the count C of the counter is incremented by 1 (S111), and the process returns to step S106. A predetermined time signal (C+1) is generated under the control of the central processing unit 41 and is supplied to the cell generation member 42, the routing information generation member 46, and the cell inspection member 43, and accordingly the output line data and the cell for path inspection or the comparison data change. If the decision is YES, the result of the inspection is evaluated (S112). If the result of the evaluation indicates "ABNORMAL", the abnormality is displayed (S114), but if the result indicates "NORMAL", the process of the path inspection is completed.

Figure 6:
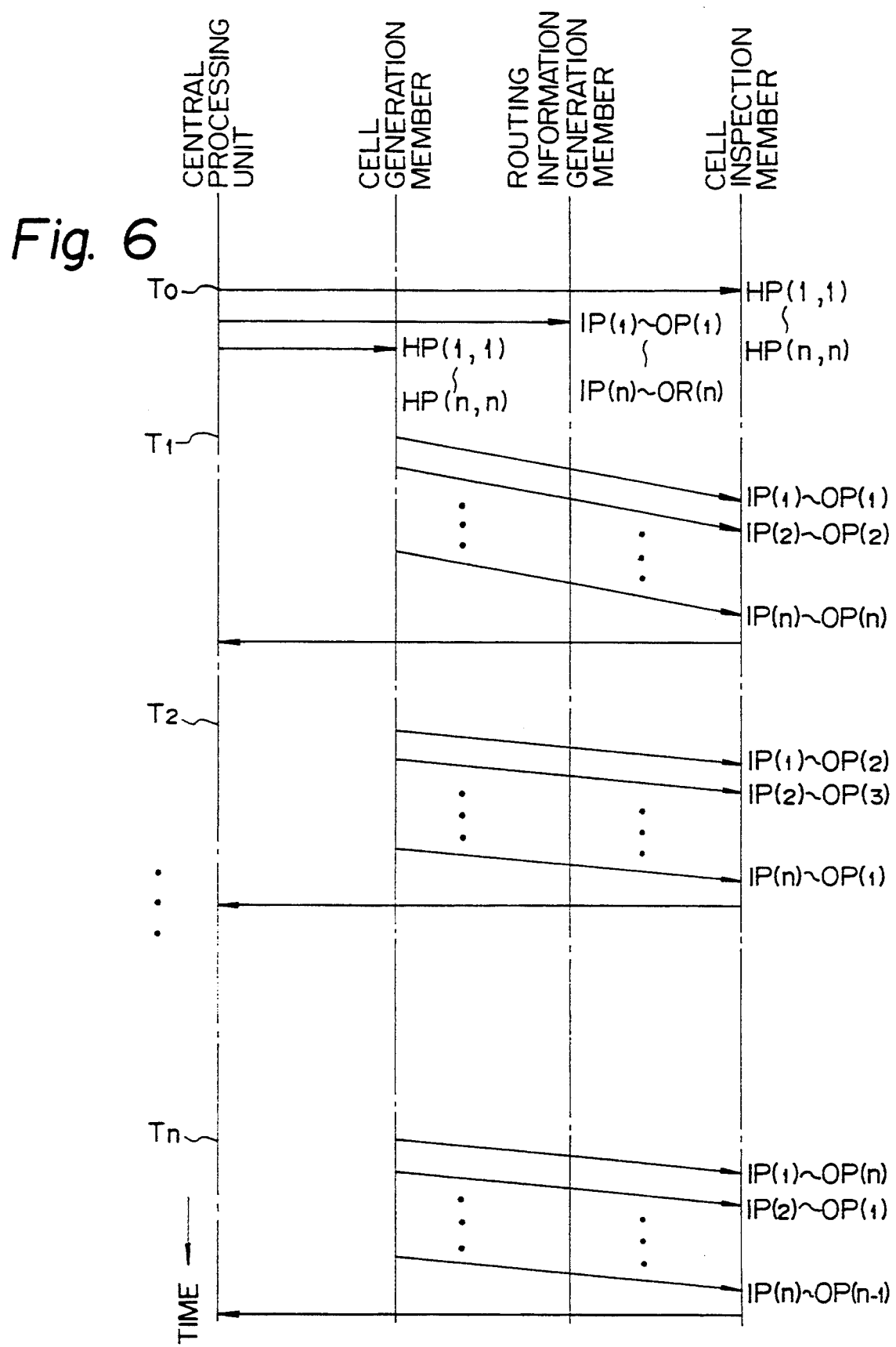
FIG. 6 illustrates the operation of the path inspection control of the asynchronous transfer mode in the apparatus of FIG. 3.

The operation of the path inspection control of the asynchronous transfer mode in the apparatus of FIG. 3 is illustrated in FIG. 6. In each of the test cycle periods $T_1$, $T_2$, . . . $T_n$, the inspections by n cells for path inspection are simultaneously carried out. Pressing the time of the process of one test cycle period is "t", only time "nt" is needed for carrying out the inspection of all paths. Thus, the time needed for all paths is significantly reduced.

An example of the sequence of the generation of the data in the path inspection control device is illustrated in FIG. 7, and another example is illustrated in FIG. 8. In the case of FIG. 7, in a cycle period $T_1$, the correspondence between the input line data and the output line data is "IP(1) to OP(1)", "IP(2) to OP(2)", . . . "IP(n) to OP(n)", and accordingly the cell data generated in the cell generation member are HP(1, 1), HP(2, 2), . . . HP(n, n). In cycle period T2, the correspondence between the input line data and the output line data is "IP(1) to OP(2)", "IP(2) to OP(3)", . . . "IP(n) to OP(1)", and accordingly the data are barrel shifted to HP(2, 2), HP(3, 3), . . . HP(n, n), HP(1, 1). In cycle period Tn, the correspondence between the input line data and the output line data is "IP(1) to OP(n)", "IP(2) to OP(1)", . . . "IP(n) to OP(n-1)", and accordingly the data are barrel shifted to HP(n, n), HP(1, 1), . . . HP(n-1, n-1). The comparison data in the cell inspection member need not be changed.

In the case of FIG. 8, in cycle period $T_1$, the correspondence between the input line data and the output line data is "IP(1) to OP(1)", "IP(2) to OP(2)", . . . "IP(n) to OP(n)", and accordingly the comparison data may be HP(1, 1), HP(2, 2), . . . HP(n, n). In cycle period T2, the correspondence between the input line data and the output line data is "IP(1) to 0P(2)", "IP(2) to 0P(3)", . . . "IP(n) to OP(1)", and accordingly the comparison data are barrel shifted to HP(n, n), HP(1, 1), . . . HP(n-1, n-1). In cycle period $T_n$, the correspondence between the input line data and the output line data is "IP(1) to OP(n)", "IP(2) to OP(1)", . . . "IP(n) to OP(n-1)", and accordingly the comparison data are barrel shifted to HP(2, 2), HP(3, 3), . . . HP(n, n), HP(1, 1). The data generated in the cell generation member need not be changed.

Figure 9B:
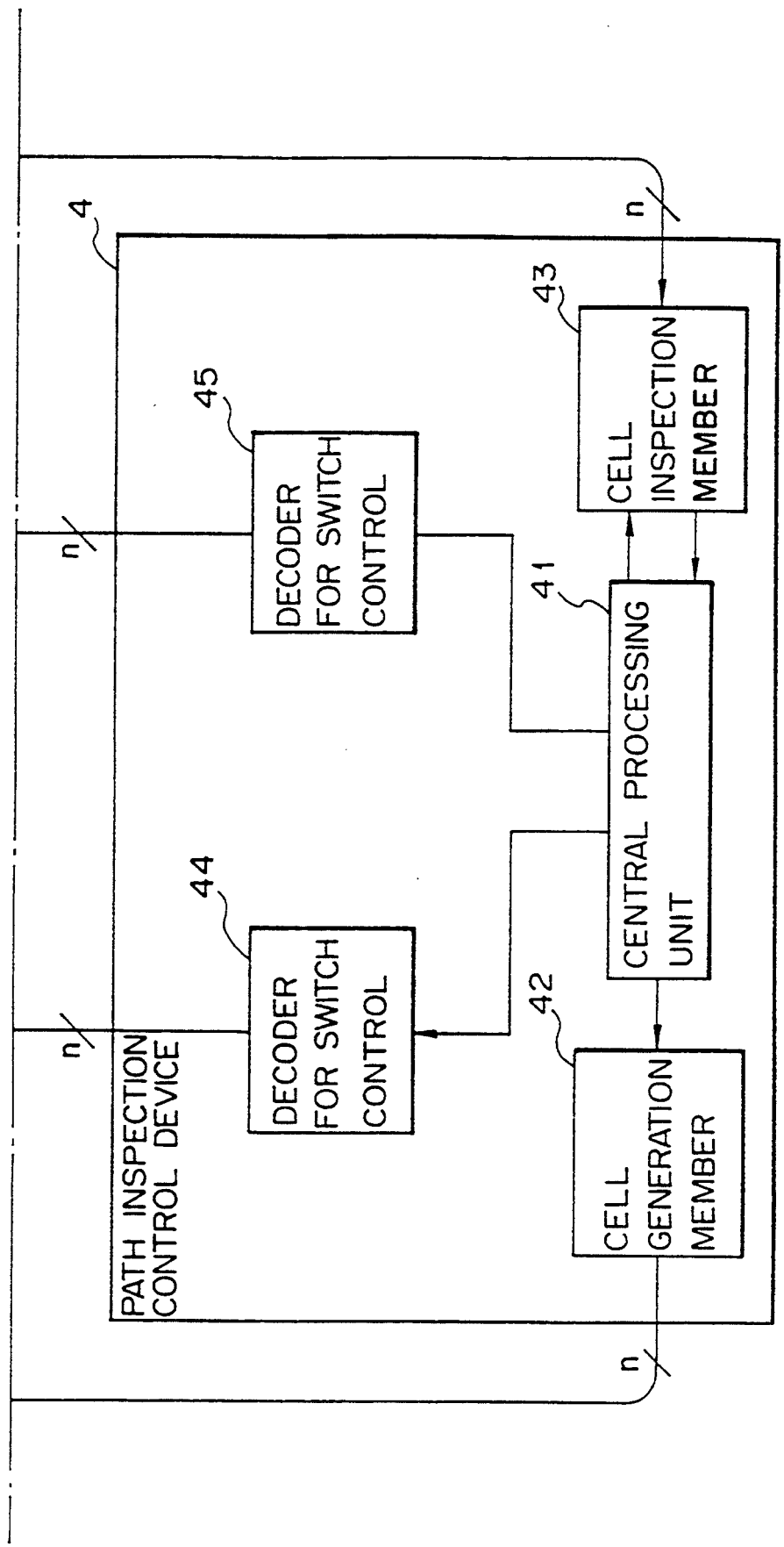

A switching apparatus for a switched network of the asynchronous transfer mode according to another embodiment of the present invention is shown in FIGS. 9A and 9B. The switching apparatus comprises an interface board 1 having a sequence of switches 11, 12, . . . 1n, a switching network 2 of the asynchronous transfer mode having a cross switch device 21 and a virtual path identifier transformation member 22, an output interface board 3 having a sequence of switches 31, 32, . . . 3n, and a path inspection control device 4 having a central processing unit 41, a cell generation member 42, a cell inspection member 43, a decoder 44 for switch control and another decoder 45 for switch control.

In the virtual path identifier transformation member 47, the output line data in the cell for path inspection is transformed into the virtual path identifier. In the switching network 2 of the asynchronous transfer mode, the cell for path inspection is changed in accordance with the destination information in the cell for path inspection.

In the switching apparatus of FIGS. 9A and 9B, the cells generated in the cell generation member 42 are led to the corresponding output lines and only by changing the generated cells are changed in accordance with the manner shown in FIG. 7, without the designation of the path of the switching network 2 of the asynchronous transfer mode from outside.

claim:

1. A switching apparatus for a switched network operable in an asynchronous transfer mode comprising:
    an input interface board adapted to receive cells for path inspection and having a sequence of switches;
    a switching network connected to said input interface board and having switching circuits for switching the transmissions of the cells for path inspection in accordance with external routing information;
    an output interface board connected to said switching network and having a sequence of switches for delivering the cells for path inspection received from said switching network; and
    a path inspection control device connected to said input interface board, said switching network and said output interface board for controlling the path inspection through said input interface board, said switching network and said output interface board, said path inspection control device operating such that cells for path inspection are supplied in parallel to said input interface board, routing information is supplied to said switching network, the transmissions of the cells for path inspection are delivered in parallel formation from said output interface board, the cells for path inspection delivered from said output interface board are compared with predetermined comparison data and the routing information and the cells for path inspection or the comparison data are changed in synchronization with predetermined time signals, the cells for path inspection being scheduled and the scheduled cells for path inspection being passed in parallel from the input side to the output side, in order to confirm the normalness of the switching functions of all the sequences of switches and switching circuits.

2. A switching apparatus according to claim 1, wherein the routing information and the cells for path inspection or the comparison data are changed through a barrel shift process by said path inspection control device.

3. A switching apparatus for a switched network operable in an asynchronous transfer mode comprising:
    an input interface board adapted to receive a cell for path inspection and having a sequence of switches;
    a switching network connected to said input interface board and having switching circuits for switching the transmissions of the cells for path inspection simultaneously in accordance with destination information of the cells for path inspection;
    an output interface board connected to said switching network and having a sequence of switches for delivering the cells for path inspection received from said switching network; and
    a path inspection control device connected to said input interface board and said output interface board for controlling the path inspection through said input interface board and said output interface board, wherein said path inspection control device operates such that cells for path inspection are supplied in parallel to said input interface board, the cells for path inspection are delivered in parallel formation from said output interface board, the cells for path inspection thus supplied and thus delivered are compared and inspected with respect to predetermined comparison data and the cells for path inspection are changed in synchronization with predetermined time signals, the cells for path inspection being scheduled and the scheduled cells for path inspection being passed in parallel from the input side to the output side, in order to confirm the normalness of the switching functions of all the sequences of switches and switching circuits.

* * * * *

UNITED STATES PATENT AND TRADEMARK OFFICE
CERTIFICATE OF CORRECTION

PATENT NO. : 5,339,310
DATED : August 16, 1994
INVENTOR(S) : TANIGUCHI

It is certified that error appears in the above-indentified patent and that said Letters Patent is hereby corrected as shown below:

Col. 4,   line 25, change "nodal" to --normal--;

Col. 5,   line 33, after "data" insert --,--.

Col. 6,   line 40, change "454" to --434--;
          line 60, change "Pressing" to --Presuming--;
          line 62, change " "nt"is " to --"nt" is--.

Col. 7,   line 21, change "T2" to --$T_2$--.

Signed and Sealed this

Twenty-ninth Day of November, 1994

Attest:

BRUCE LEHMAN

Attesting Officer        Commissioner of Patents and Trademarks